Patented May 20, 1930

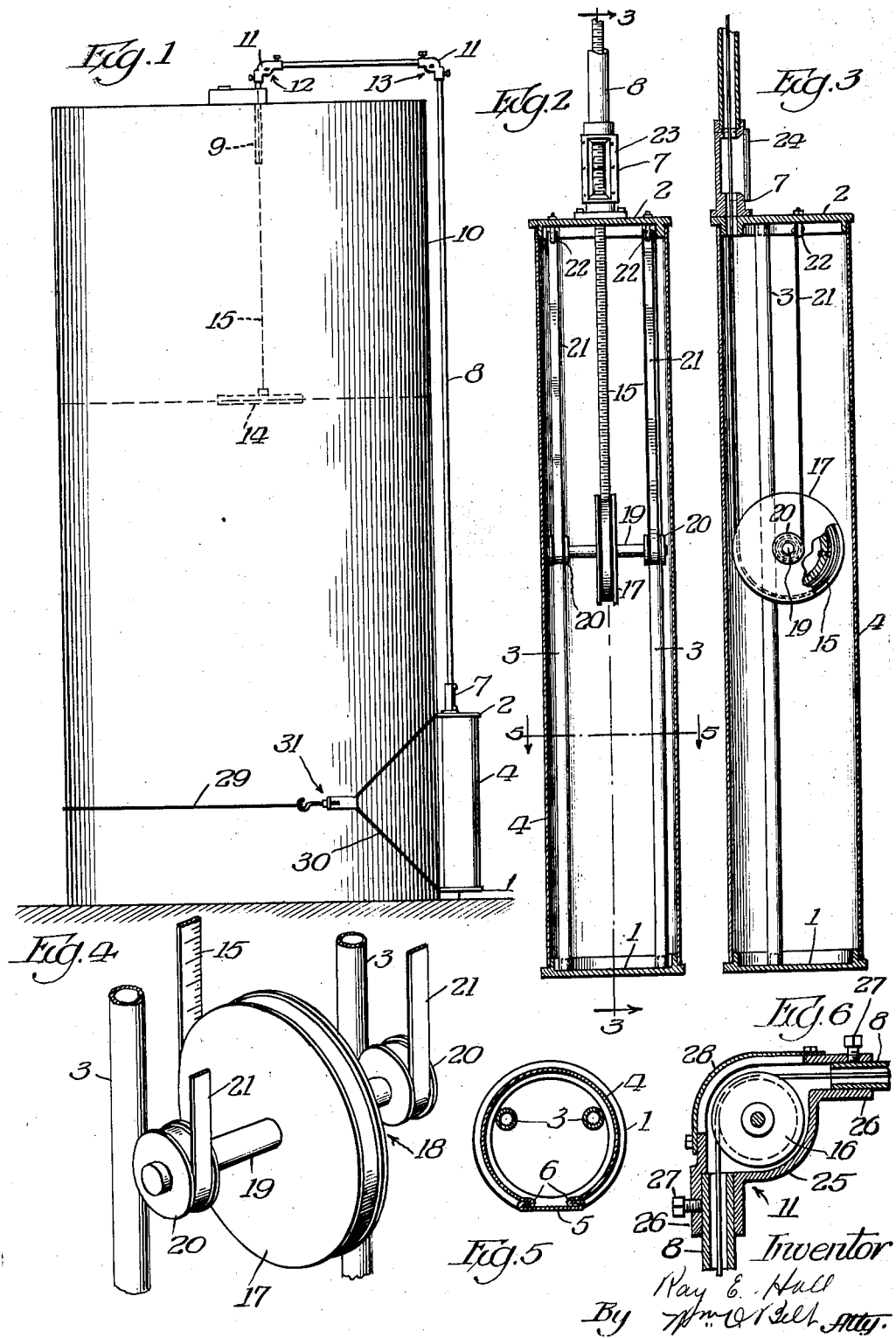

1,759,572

UNITED STATES PATENT OFFICE

RAY E. HALL, OF CHICAGO, ILLINOIS, ASSIGNOR TO HALL RESEARCH CORPORATION, OF CHICAGO, ILLINOIS, A CORPORATION OF DELAWARE

TANK GAUGE

Application filed February 20, 1928. Serial No. 255,515.

This invention relates to gauges for measuring the height of oil in storage tanks so that the volume of oil in the tank may be readily determined at any time.

The principal objects of the invention are to provide a tank gauge which is substantially frictionless in operation; which embodies a graduated steel tape readable at a convenient location and height; and which has a frictionless take-up operating within practical limits.

Another object is to provide a leverage device for tank gauges which consists of three reels or drums relatively fixed, and having straps or cables wound thereon which act as true supports.

Another object is to provide a tank gauge which is simple in construction, efficient in operation, compact in size, and which is completely protected from the elements.

In the accompanying drawings illustrating a selected embodiment of the invention, the views are as follows:

Fig. 1 is an elevation of an oil tank embodying the invention.

Fig. 2 is a detail sectional view showing the tank gauge casing and the take-up or leverage device.

Fig. 3 is a section on the line 3—3 of Fig. 2.

Fig. 4 is a detail perspective view of the take-up, or leverage device.

Fig. 5 is a transverse sectional view taken on the line 5—5 of Figure 2.

Fig. 6 is a detail sectional view of one of the pulley members.

Referring to the drawing, 1 designates a base and 2 a top plate which are connected by vertical rods, or pipes 3. A cylindrical casing or housing 4 preferably made of sheet metal is fastened about the base and the top plate and connected by a longitudinal clip 5 which engages the free outwardly turned ends 6, for keeping the casing closed and maintaining the casing in proper normal relative position.

A sight 7 is fastened to the top plate 2 and receives one end of a pipe line 8. The end 9, of the pipe line 8, projects downwardly a suitable distance into an oil tank 10. Pulley members 11 are provided at the turns 12 and 13 of the pipe line 8 and a float 14, adapted to register the fluid line in the tank 10, has a graduated steel tape 15 connected thereto. The tape 15 is encased in the pipe line 8 and is free to ride over a pulley 16 rotatively mounted in each of the members 11.

The free end of the tape 15 is connected to a reel 17, which is fixed to a transverse shaft 19, and to the two smaller reels 20, which are fixed to the outer ends of the shaft 19, and are suitably spaced from the reel 17. Tapes or cables 21 have their lower ends connected to the reels 20, at the side opposite to which the tape 15 is connected to the reel 17. The upper ends of the tapes 21 are connected to the top plate 2, at 22, Fig. 2. The take-up 18 comprises, in effect, a leverage device operating vertically within the casing 4, to take up the slack of the tape 15 when the float 14 is raised, and to let out the tape when the float lowers.

The sight 7 has a face 23 upon which a glass plate 24 may be secured, so that the tape 15 can be easily read and still be protected from the elements.

Each member 11, comprises the pulley rotatively mounted in a body 25 having tubular ends 26 to receive the pipe 8. The pipe 8 is held in position in the tubular ends 26 by means of a set screw 27. The body is also provided with a removable plate 28 to permit access within the member and for threading the tape 15 within the pipe line 8.

The apparatus may be fastened to the tank 10 in any number of ways, but I have shown it held in place by means of a line or wire 29 encircling the tank and fastened to the guy lines 30. A member 31 may be interposed between the ends of the line 29 and the guy lines 30 to take up the slack in the lines 29 and 30 to maintain the apparatus in fixed position.

The apparatus operates as follows: After the skeleton frame has been assembled and the pipe line 8 has been installed, the tape 15 is secured to the float 14 and threaded through the pipe line 8, and over the pulleys 16. The free end of the tape is then secured to the large reel 17 of the take-up or leverage device 18. The tapes or cables 21 have their upper ends secured to the top plate 2 and their lower ends connected to the reels 21 at the side opposite to the side to which the tape 15 is connected to the reel 17. After suitable adjustments have been made to insure the correct reading of the tape, the casing 4 is placed about the skeleton frame and locked by the clip 5. The take-up or leverage device 18 is sufficiently heavy to take up all the slack in the tape 15 and light enough not to affect the float 14 and still be controlled thereby.

When the float raises in the tank 10 the tape 15 will be "taken up" by the take-up device 18 which is responsive to the movement of the float. The tendency of the take-up is to drop, but as the tape 15 is wound on the reel 17 the reel will rotate and unwind the tape therefrom and in doing so the supporting tapes 21 will wind up on the reels 20.

When the float lowers, the tape on the reel 17 will unwind and the tape on the reels 20 will wind. It will thus be seen that considerable movement of the float 14 merely causes slight vertical movement of the take-up or leverage device 18 and that vertical movement of the float will cause bodily movement vertically of the reel structure in the casing.

It is, of course, understood that I may make the reels 20 and the reel 17 of various sizes to obtain whatever ratio of movement between them that may be desired.

While I have shown the take-up or leverage device employed in an oil tank gauge it may be also applied to any similarly controlled apparatus or device with equal success.

I am aware that changes may be made in the form, construction and arrangement of parts without departing from the spirit and without sacrificing any of the advantages of the invention and I reserve the right to make all such changes as fairly fall within the scope of the following claims.

I claim:

1. A tank gauge comprising a casing, a horizontal shaft in said casing mounted for freedom of movement vertically, a reel fixed to each end of said shaft, flexible means connected to each reel and to the top of said casing and adapted to be wound on said reels, a float extraneous said casing, a reel fixed to said shaft intermediate said other reels, and graduated means connected to said float and to said intermediate reel and adapted to be wound on said intermediate reel in a direction opposite to the winding direction of said other reels.

2. The combination of a casing, a reel bodily movable vertically in said casing, vertical guide members for guiding the reel in its vertical movement, a tape connected to said reel and adapted to be wound upon or unwound from said reel, and means operable by the downward movement of the reel to rotate the reel in a direction to wind the tape thereupon.

3. The combination of a casing, a reel bodily movable vertically in said casing, vertical guide members for guiding the reel in its vertical movement, a tape connected to said reel and adapted to be wound upon or unwound from said reel, and means operable by the downward movement of the reel to rotate the reel in a direction to wind the tape thereupon, and a float connected to said tape to control the same whereby to rotate the reel in the opposite direction to unwind the tape therefrom.

4. In a tank gauge a reel bodily movable vertically, a flexible tape adapted to be wound upon or unwound from the reel during its bodily movement, and means for rotating the reel on its downward movement to wind the tape thereon.

5. In a tank gauge, a reel, a flexible tape adapted to be wound upon or unwound from the reel, a second reel connected to and movable with the first reel, a second tape having one end thereof anchored and having the other end thereof connected to the second reel for winding upon or unwinding from the second reel in the direction opposite to the simultaneous winding or unwinding of the flexible tape to bodily and vertically move said reels during said winding or unwinding movement, and a movable float connected to the first tape whereby movement thereof will result in the winding or unwinding of said first tape.

6. The combination of a tank having a float therein responsive to variations of liquid level in the tank, a bodily vertically movable rotary reel structure outside of said tank, a measuring tape connected to said float and to the reel structure for winding on the reel structure in one direction, a second tape having one end connected to the reel structure to wind thereon in the direction opposite to the winding of the first tape, said second tape being anchored at its other end above said reel structure, and vertical guides for guiding the reel structure in its vertical bodily movement.

7. A tank gauge comprising a casing, a horizontal shaft in said casing, reels fixed to and spaced apart on said shaft, tapes connected to said reels and to said casing above the reels to wind upon said reels in one direction, an intermediate larger reel fixed to said shaft, a float, a graduated tape connecting said float and said intermediate reel to wind upon said reel in the opposite direction, and vertical guide rods within the casing for guiding the vertical movement of the shaft and reels.

8. A tank gauge comprising a casing, a sight member having an opening and connected to said casing, a pipe line having bends therein and connected to said sight member, pulley members mounted at the bends of said pipe line, pulleys in said pulley members, a rotary and bodily movable counterbalancing device in said casing comprising a shaft, reels connected to said shaft, tapes connected to said casing and to said reels to wind in one direction thereon, a float extraneous said casing, and a graduated tape in said pipe line extending over said pulleys and having one end connected to said float and the other end connected to another of said reels to wind thereupon in the opposite direction of the winding of the tapes on the reels, whereby vertical movement of said float causes bodily and rotary movement of said counterbalancing device.

9. The combination of a tank, a float therein responsive to variations in liquid level in said tank, a reel outside of the tank and connected with and adapted to move bodily in accordance with the movement of the float, a graduated tape connecting the float and reel, means for rotating the reel during its bodily movement to wind the tape on said reel, and a guide for guiding the bodily movement of the reel.

RAY E. HALL.